Jan. 7, 1930.  C. R. HASKELL  1,742,703
MACHINE FOR MANUFACTURING TUBULAR FARINACEOUS ROLLS
Filed Dec. 16, 1926    8 Sheets-Sheet 1

Jan. 7, 1930.  C. R. HASKELL  1,742,703
MACHINE FOR MANUFACTURING TUBULAR FARINACEOUS ROLLS
Filed Dec. 16, 1926   8 Sheets-Sheet 2

Jan. 7, 1930.  C. R. HASKELL  1,742,703
MACHINE FOR MANUFACTURING TUBULAR FARINACEOUS ROLLS
Filed Dec. 16, 1926   8 Sheets-Sheet 3

INVENTOR.
C. Ray Haskell.
BY E. W. Anderson
ATTORNEY.

Jan. 7, 1930.    C. R. HASKELL    1,742,703
MACHINE FOR MANUFACTURING TUBULAR FARINACEOUS ROLLS
Filed Dec. 16, 1926    8 Sheets-Sheet 4
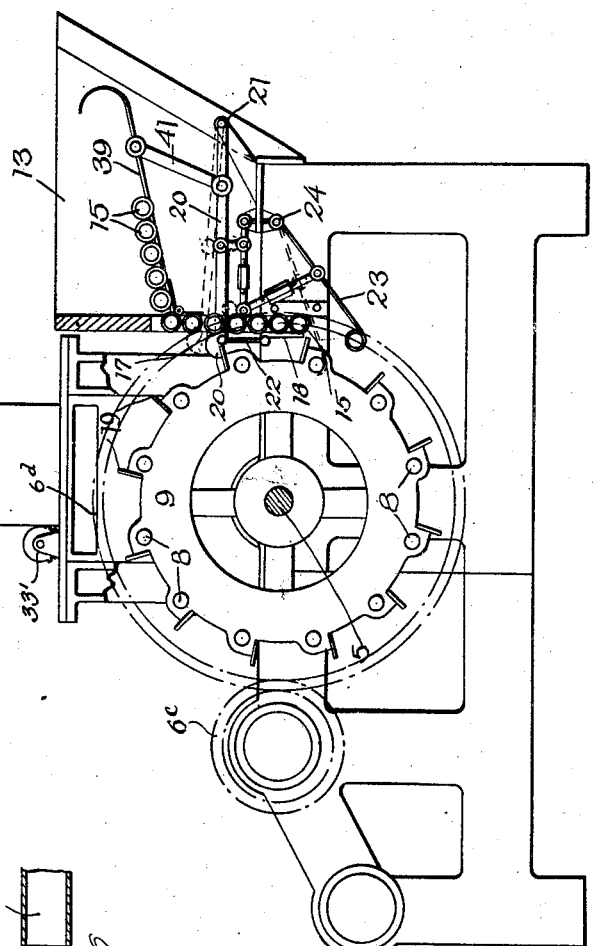
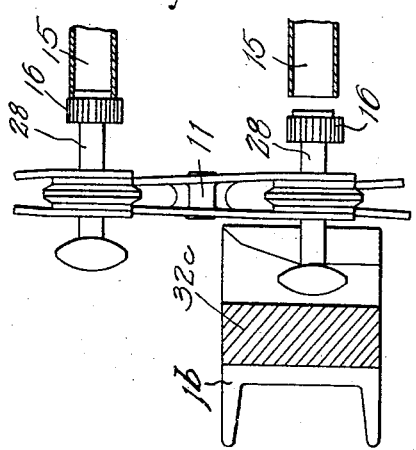

Jan. 7, 1930. C. R. HASKELL 1,742,703
MACHINE FOR MANUFACTURING TUBULAR FARINACEOUS ROLLS
Filed Dec. 16, 1926 8 Sheets-Sheet 5
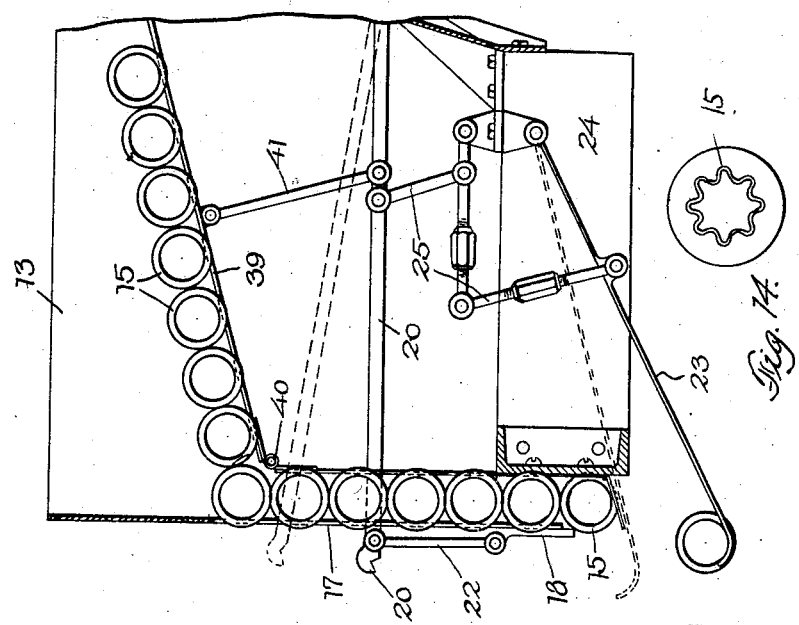
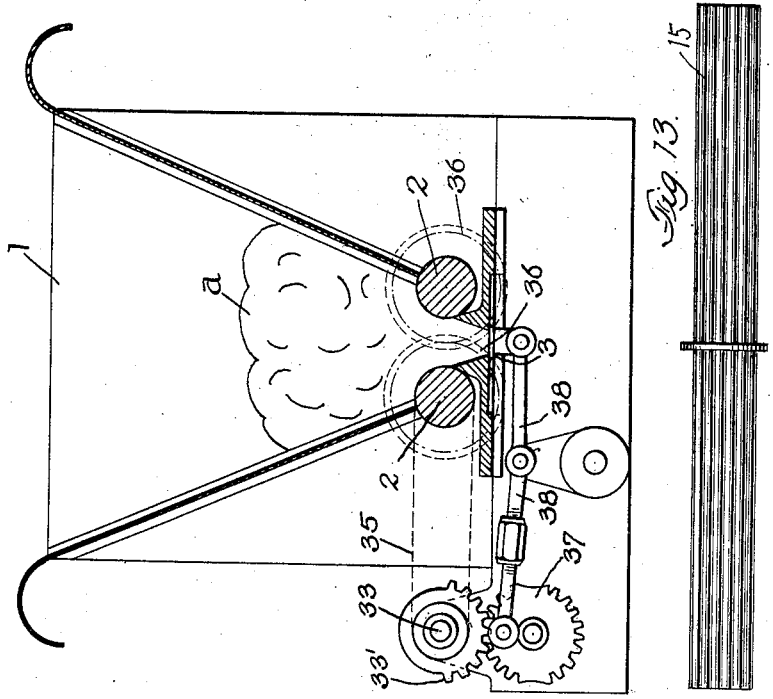
C. Ray Haskell INVENTOR
BY
E. W. Anderson
ATTORNEY Jan. 7, 1930.  C. R. HASKELL  1,742,703
MACHINE FOR MANUFACTURING TUBULAR FARINACEOUS ROLLS
Filed Dec. 16, 1926   8 Sheets-Sheet 6
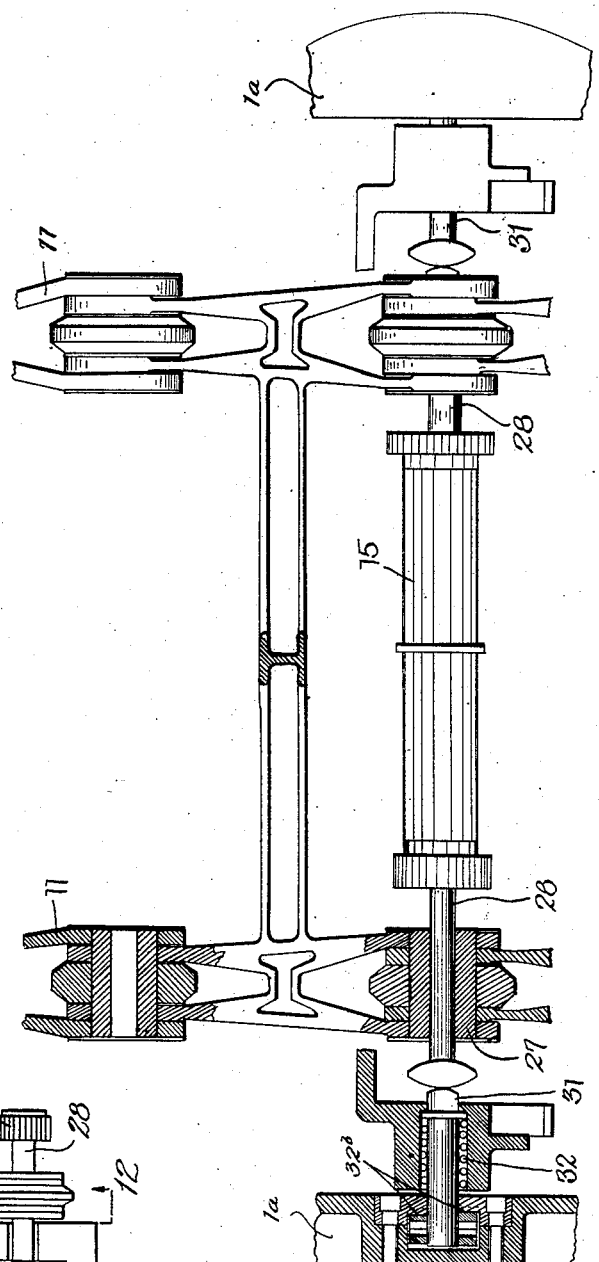

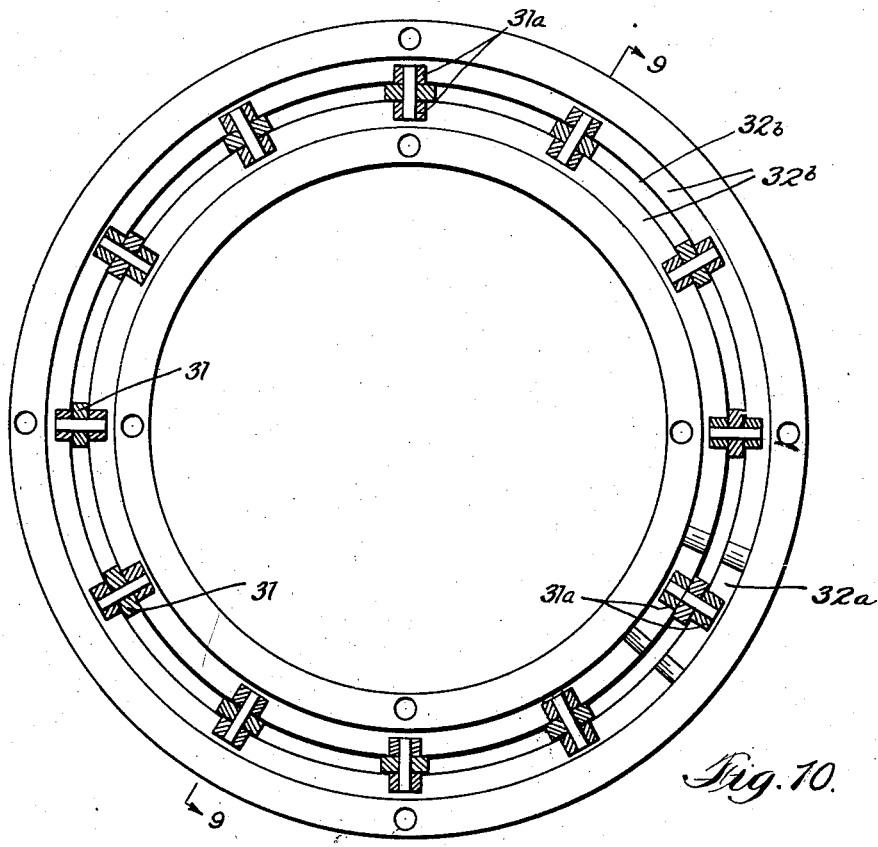

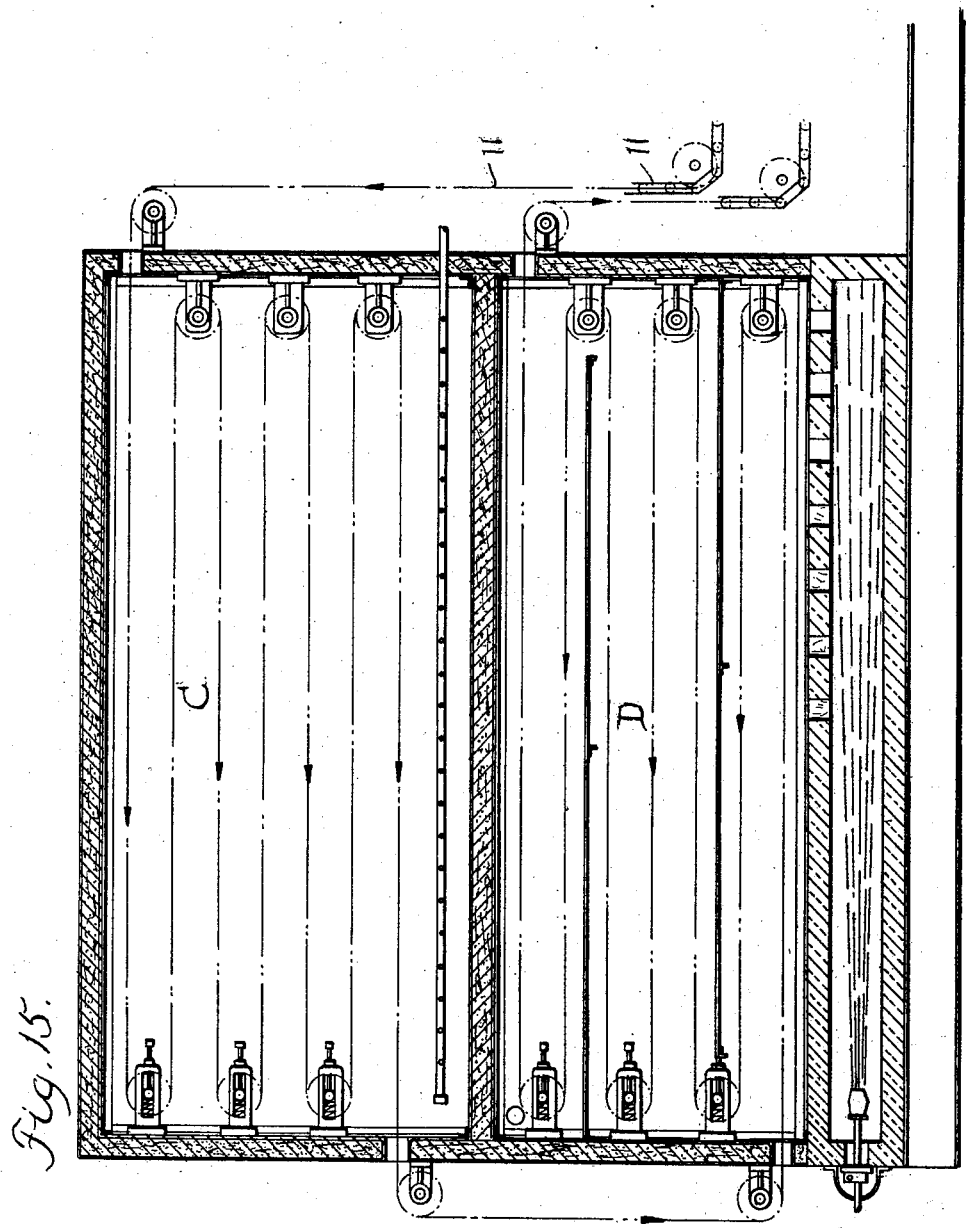

Patented Jan. 7, 1930

1,742,703

UNITED STATES PATENT OFFICE

CHARLES RAY HASKELL, OF YOUNGSTOWN, NEW YORK, ASSIGNOR TO HASKELL CORPORATION, OF NIAGARA FALLS, NEW YORK, A CORPORATION OF NEW YORK

MACHINE FOR MANUFACTURING TUBULAR FARINACEOUS ROLLS

Application filed December 16, 1926. Serial No. 155,270.

The invention relates to a machine for manufacturing tubular farinaceous rolls automatically and without touching the same by hand, an object being to produce such rolls economically and expeditiously in large quantities in a highly sanitary manner, the special nature of the farinaceous roll being explained in my United States Patent Number 1,589,850, dated June 22, 1926. Other objects and advantages will appear hereinafter.

The invention consists in the novel construction and combinations of parts, as set forth in the appended claims.

Figure 1:
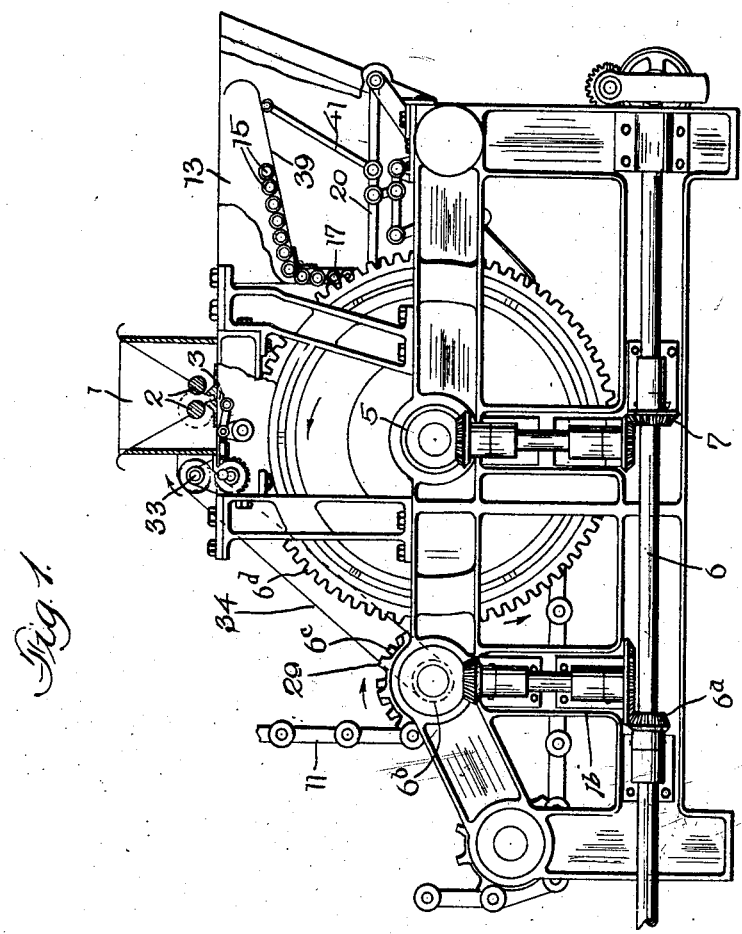
Figure 2:
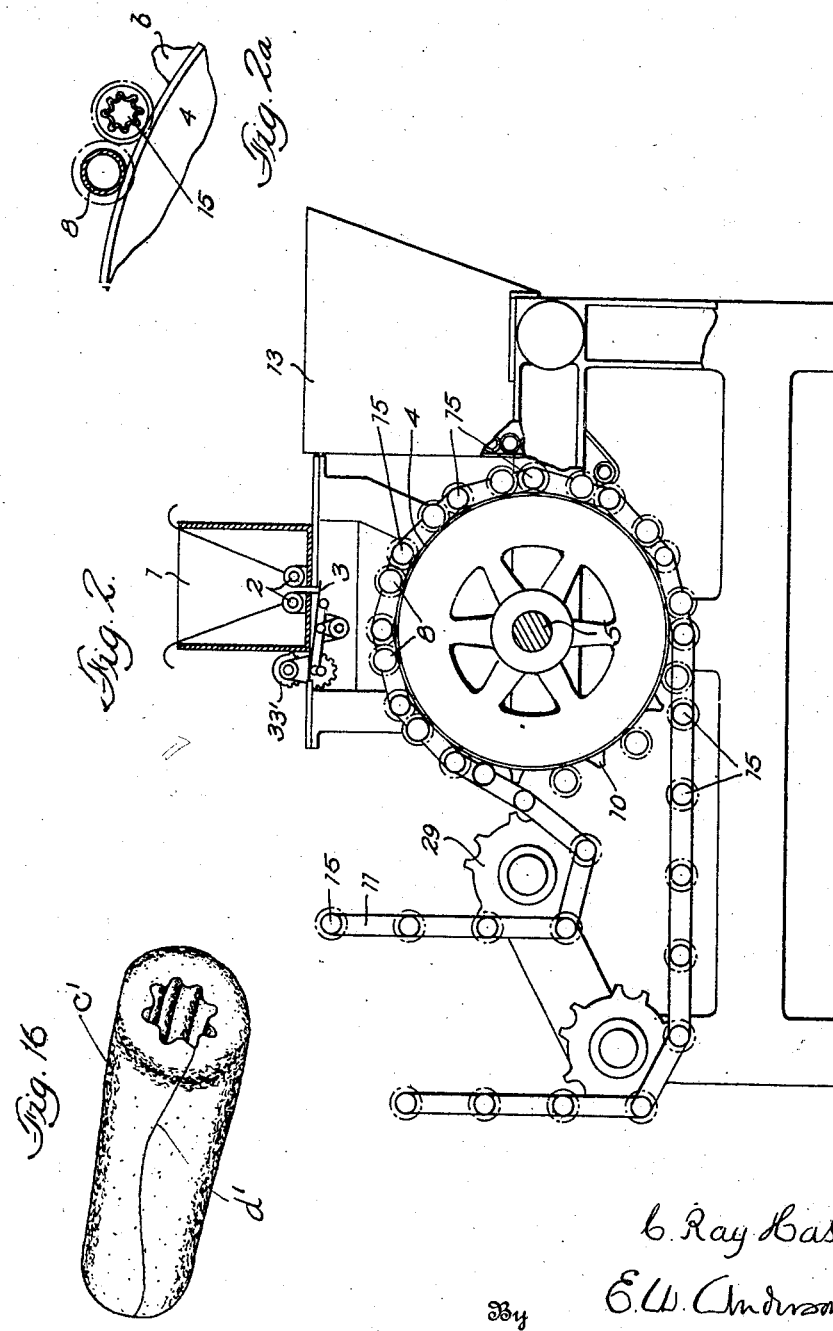
Figure 3:
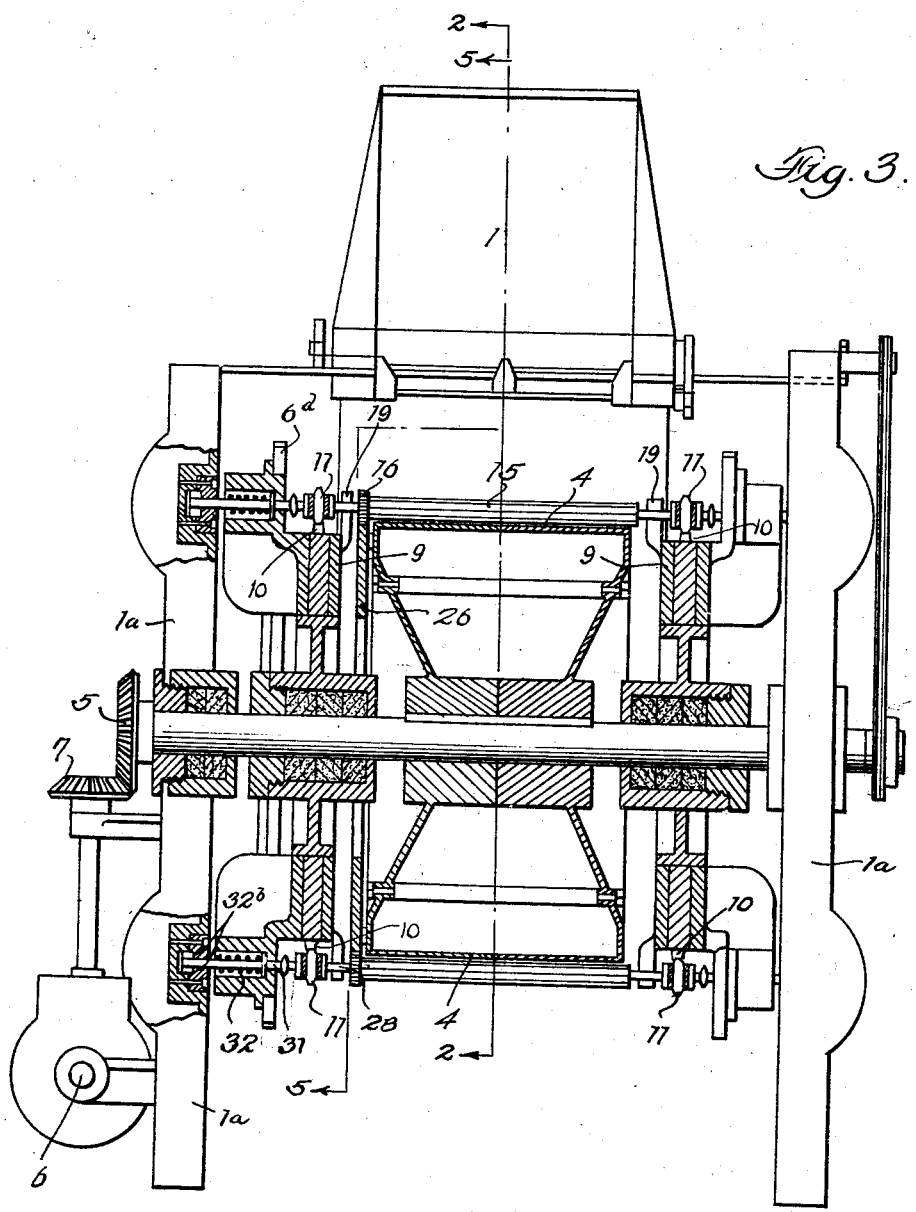
Figure 4:
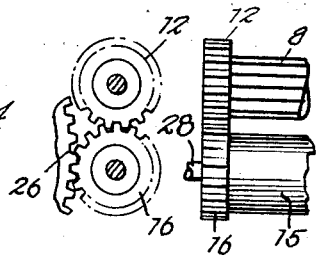

In the accompanying drawings, illustrating an embodiment of the invention, Figure 1 is a side view of the machine with parts in section, the conveyor chain being broken away; Figure 2 is a section on the line 2—2, Figure 3, with parts in section and showing the core rollers and cooperating rollers diagramatically; Figure 2ª is a detail fragmentary view partly in section showing a portion of the rotary drum, the rollers for operation on the dough, and a piece of dough; Figure 3 is a transverse section of the invention with parts in full lines and parts broken away; Figure 4 includes detail fragmentary side and end views of the rollers and their gears; Figure 5 is a section on the line 5—5, Figure 3, with parts in full lines; Figure 6 is a detail vertical longitudinal section of the dough hopper; Figure 7 is a similar view of the roller hopper showing the core rollers diagramatically; Figure 8 is a detail fragmentary plan view partly in section of the conveyor, one of the core rollers, its journal pins, and the means for driving said pins into engagement with said roller; Figure 9 is a section of one of the circular tracks on the line 9—9, Figure 10; Figure 10 is a section on the line 10—10, Figure 9; Figure 11 is a detail side view of the cam for withdrawing the journal pins from the core rollers; Figure 12 is a section on the line 12—12, Figure 11; Figure 13 is a detail side view of one of the core rollers; Figure 14 is a detail end view of the same and Figure 15 is a longitudinal vertical section of the ovens showing the course of the conveyor therethrough, and Figure 16 is a detail perspective view of one of the rolls as produced.

In these drawings, the numeral 1 designates a hopper mounted between opposite standards 1ª and wherein the dough $a$ is placed and fed downwardly between two rollers 2, 2, to protrude below the same, being cut off in successive lumps $b$ by a reciprocatory slide 3, said lumps through gravity falling upon a constantly rotating drum or platform 4, the shaft 5 of which is driven by shaft 6 and bevel gearing 7 and has bearings in said standards.

Arranged circumferentially and transversely of said drum is an annular series of rotary tubes 8, spaced apart and having journal bearings in and being carried by a rotary annulus 9, fast to a sprocket wheel 10, around which passes the chain conveyor 11. The rotary annulus 9 and its tubes 8 and the chain conveyor 11 are driven at the same rate of speed by shaft 6 having bevel gear connection 6ª with shaft 6ᵇ, the latter carrying pinion 6ᶜ, meshing with spur gear 6ᵈ fast to sprocket wheel 10.

Located adjacent the dough hopper 1 and below the same forwardly thereof is another hopper 13 for the tubes 15, the latter constituting each a core whereon the lump of dough $b$ is caused to be rolled in tubular form as will be explained.

These core tubes or rollers 15 are fed by gravity from the hopper through a vertical conduit 17 thereof, a reciprocatory gate 18 holding the tubes 15 from escape from the lower end of said conduit, said gate being raised periodically by contact of the members of an annular series of spaced circumferential projections 19 of said rotary annulus 9, each projection 19 contacting with the free end of a lever 20 fulcrumed at 21 and having a link connection 22 with said gate, to permit the lowermost tube 15 to escape upon each upward movement of the gate, said tube being caught by the upturned hook end of an arm 23 pivoted at 24 and having an operating connection 25 with said lever to raise said arm as said lever and said gate are raised, said hook end of the arm at the termination of the upward positioning the tube 15 circumferentially of the drum 4 below and immediately in rear of the related roller 8. The sprocket chains 11 are provided in duplicate and the joint pins 27 thereof are provided with perforations wherein journal pins 28 for the core rollers 15 are slidable and rotatable, said journal pins being at this time driven inwardly and seated in axial recesses of the tubes 15 to cause said tubes to be connected up one at a time with and carried by the sprocket chains 11 now forming a conveyor therefor, as will now be explained.

The opposite journal pins 28 of the tubes 15 are forced into engagement with the axial recesses of said tubes by means of an annular series of plungers 31, rollers 31$^a$ of said plungers working in an annular track 31$^b$ of the standard 1$^a$ at each side of the machine, said plungers being normally held withdrawn against the tension of coiled springs 32 thereof and released periodically by the movement of the rollers of the plungers seriatim within a recess 32$^a$ of said track. The recesses 32$^a$ have cam ends 32$^b$ whereby the rollers are restored to normal withdrawn position.

The journals 28 of the rollers 15 are provided with spur gears 16, designed as the chains 11 pass over sprocket wheels 10, to mesh with spur gears 12 of the rollers 8 and also with a ring gear 26, fast to drum 4.

The core rollers 15 being successively connected up with the conveyor chain 11 and carried around the drum 4, the lumps of dough $b$ dropped from the dough hopper will fall upon the said drum, each immediately in rear of the related tube 15, and owing to the fact that said drum is traveling at a greater speed than the conveyor chain 11 and the rotary annulus 9 carrying the rollers 8 and 15, the lumps of dough will be each carried by the drum into engagement with the related roller 15, which is rotated by its gears in the proper direction to carry the dough lump beneath and between the same and the drum, and around between the tubes 8 and 15.

Due to the speed reduction gearing 6$^c$, 6$^d$, the chain conveyor 11 and rotary annulus 9 and their rollers 8 and 15 will travel slowly compared to the speed of movement of the drum 4. For the same reason the ring gear 26 fast to said drum will rotate the spur gear 16 and said rollers as they travel around said drum 4. The rollers or tubes 8 and 15 are spaced slightly from each other and from the circumferential surface of the drum 4.

The tubes 8 and 15 are each of cylindrical form basically and the core tubes 15 are provided with longitudinal parallel circumferential grooves and intermediate ridges as explained in my United States Patent No. 1,589,849, dated June 22, 1926, the tube 15 being adapted to be rolled upon the lump of dough resting upon the rotary platform or drum 4 and to pick up said dough in the rolling pressure of said tube, said dough being thereby distributed around said tube or core roller 15 in the form of a tubular roll $c'$, having its longitudinal joint $d'$ sealed or closed in said rolling pressure of the dough between the tubes 15 and said drum, aided by the cooperating roller or tube 8, which acts as a backing for the dough, forcing the same to be rolled around the tube 15.

The tubular rolls of dough having been formed successively around the tubes 15 of the conveyor 11, said tubes with the dough rolls thereon are successively disconnected from said conveyor by temporarily retracting the tube retaining or journal pins 28 by a cam 32$^c$ of each of the standards 1$^b$.

This discharge of the tubes 15 and the dough rolls thereon may be into a baking pan, or the conveyor 4 may be extended to pass through a bake oven D to bake the rolls or through a proofing oven C to raise the dough, as would be required in the case of bread rolls made with yeast, and further extended to pass through a bake oven, the tubes 15 with the baked rolls thereon being then successively discharged by retraction of the tube retaining or journal pins 28 as explained.

In case the dough is of pastry or biscuit nature with a baking powder constituent, the proofing oven to raise the dough would not be needed.

The dough feed rollers 2 are rotated by shaft 33 driven by chain 34 from the shaft of conveyor guide sprocket wheel 29 upon shaft 6$^b$, said shaft having chain connection 35 with one of the meshed gears 36 of said rollers. The slide 3 is reciprocated by Geneva gear 37 in mesh with the gear 33′ upon shaft 33, and having link connection 38 with said slide.

The core roller hopper 13 is provided with an inclined bottom plate 39 pivoted at 40 and having a link connection 41 with the lever 20, said bottom plate being oscillated upwardly and downwardly to prevent the tubes from jamming in the hopper.

In the passage of the conveyor 11 through the proofing oven and baking oven, the tubular farinaceous rolls suspended from the core tubes or rollers 15 will be turned through an arc of 180° repeatedly in the tortuous course of the conveyor, thereby more nearly preserving the cylindrical form of the rolls and browning the same more equally.

The baked tubular farinaceous rolls, after passage of the conveyor through the oven and release of the core rollers from the machine, are removed from the core tubes or rollers endwise thereof by hand, the longitudinal parallel corrugations of the core rollers enabling this to be done without injury to said rolls.

I claim:

1. In a machine for manufacturing tubular farinaceous rolls, a platform, a conveyor traveling over said platform and carrying a series of core rollers, means for feeding pieces of dough upon said platform adjacent to successive core rollers, and means for rotating said rollers and causing each core roller in its rotation over said platform to accumulate thereon the related piece of dough in tubular form.

2. In a machine for manufacturing tubular farinaceous rolls, a platform, a conveyor traveling over said platform and carrying a series of core rollers, means for feeding pieces of dough upon said platform adjacent to successive core rollers, a rotary carrier having a series of backing rollers located adjacent to said core rollers, and means for rotating both series of rollers, each said core roller in cooperation with its backing rollers being adapted in its rotation over said platform to accumulate thereon the related piece of dough in tubular form.

3. In a machine for manufacturing tubular farinaceous rolls, an oven, a platform, a conveyor traveling over said platform and thereafter through said oven and carrying a series of core rollers, means for feeding pieces of dough upon said platform, means for rotating said rollers and causing each roller in its rotation over said platform to accumulate thereon the related piece of dough in tubular form, and means for feeding and connecting the core rollers successively to the conveyer prior to passage over said platform and disconnecting the same with the farinaceous rolls thereon from the conveyor after passage through said oven.

4. In a machine for manufacturing tubular farinaceous rolls, an oven, a rotary platform, an endless conveyor traveling over said platform and thereafter through said oven and carrying a series of core rollers, the conveyor and the platform having different rates of speed, means for feeding pieces of dough upon said platform, a rotary carrier having a series of backing rollers located adjacent to the core rollers, and means for rotating both series of rollers, each of the core rollers in cooperation with its backing roller being adapted in its rotation over said platform to accumulate thereon the related piece of dough in tubular form.

5. In a machine for manufacturing tubular farinaceous rolls, an oven, a rotary platform, an endless conveyor traveling over said platform and thereafter through said oven and carrying a series of core rollers, the conveyor and the platform having different rates of speed, means for feeding pieces of dough upon said platform in front of successive core rollers, a rotary carrier having a series of backing rollers located adjacent to said core rollers, means for rotating both series of rollers, each of the core rollers in cooperation with its backing rollers being adapted in its rotation over said platform to accumulate thereon the related piece of dough in tubular form, and means for feeding and connecting the core rollers successively to the conveyor prior to passage over said platform and disconnecting the same with the farinaceous rolls thereon from the conveyor after passage through the oven.

6. In a machine for manufacturing tubular farinaceous rolls, an oven, a platform, a conveyor traveling over said platform and thereafter through said oven and carrying a series of core rollers, means for feeding pieces of dough upon said platform adjacent to succesive core rollers, means for rotating said rollers and causing each roller in its rotation over said platform to accumulate thereon the related piece of dough in tubular form, means for feeding and connecting the core rollers successively to and disconnecting the same from the conveyor including a hopper for the rollers and means controlled by the drive of said conveyor for intermittently discharging the rollers from said hopper.

7. In a machine for manufacturing tubular farinaceous rolls, an oven, a rotary platform, an endless conveyor traveling over said platform and thereafter through said oven and carrying a series of core rollers, the conveyor and the platform having different rates of speed, means for feeding pieces of dough upon said platform, a rotary carrier having a backing series of rollers located adjacent to said core rollers, means for rotating both series of rollers, each of the core rollers in cooperation with its backing rollers being adapted in its rotation over said platform to accumulate thereon the related piece of dough in tubular form, and means for feeding and connecting the rollers to and disconnecting the same from the conveyor including a hopper for the rollers and means controlled by said rotary carrier for intermittently discharging the rollers from said hopper and delivering the same to said conveyor.

8. In a machine for manufacturing tubular farinaceous rolls, an oven, a rotary platform, an endless conveyor traveling over said platform and thereafter through said oven and carrying a series of core rollers, the conveyor and the platform having different rates of speed, means for feeding pieces of dough upon said platform, a rotary carrier having a series of backing rollers located adjacent to said core rollers, means for rotating both series of rollers, each of the core rollers in cooperation with its backing roller being adapted in its rotation over said platform to accumulate thereon the related piece of dough in tubular form, and means for feeding and connecting the rollers to and disconnecting the same from the conveyor including a hopper for the rollers and means controlled by said rotary carrier for intermittently discharging the rollers from said hopper and delivering the same to said conveyor, said hopper having a movable bottom, and means for moving said bottom as the rollers are fed to prevent jamming thereof.

9. In a machine for manufacturing tubular farinaceous rolls, an oven, a platform, a conveyor traveling over said platform and thereafter through said oven and carrying a series of core rollers, means for feeding pieces of dough upon said platform, means for rotating said rollers and causing each roller in its rotation over said platform to accumulate thereon the related piece of dough in tubular form, means for feeding and connecting the core rollers successively to the conveyor prior to passage over said platform and disconnecting the same with the farinaceous rolls thereon from the conveyor after passage through said oven, including journal pins carried by the joint elements of said conveyor and slidable into and out of engagement with said rollers.

10. In a machine for manufacturing tubular farinaceous rolls, an oven, a platform, a conveyor traveling over said platform and thereafter through said oven and carrying a series of core rollers, means for feeding pieces of dough upon said platform, means for rotating said rollers and causing each roller in its rotation over said platform to accumulate thereon the related piece of dough in tubular form, means for feeding and connecting the core rollers successively to the conveyor prior to passage over said platform and disconnecting the same with the farinaceous rolls thereon from the conveyor after passage through said oven, including opposite journal pins carried by the joint elements of said conveyor and spring plunger means.

11. In a machine for manufacturing tubular farinaceous rolls, an oven, a platform, a conveyor traveling over said platform and thereafter through said oven and carrying a series of core rollers, means for feeding pieces of dough upon said platform, means for rotating said core rollers and causing each roller in its rotation over said platform to accumulate thereon the related piece of dough in tubular form, means for feeding and connecting the core rollers successively to the conveyor including journal pins carried by the joint elements of the conveyor and spring plunger means, and cam means for disconnecting said journal pins from said rollers to disconnect the same from the conveyor.

12. In a machine for manufacturing tubular farinaceous rolls, an oven, a platform, a conveyor traveling over said platform and through said oven and carrying a series of core rollers, means for feeding pieces of dough upon said platform, means for rotating said core rollers and causing each roller in its rotation over said platform to accumulate thereon the related piece of dough in tubular form, means for feeding and connecting the core rollers successively to the conveyor including opposite journal pins carried by the joint elements of the conveyor, circular tracks, an annular series of spring retracted plungers carrying anti-friction rollers working in each track, the latter having a recess wherein said anti-friction rollers will be driven by their springs to drive said plungers successively against opposite journal pins, and means for disconnecting the journal pins from said core rollers.

13. In a machine for manufacturing tubular farinaceous rolls, an oven, a rotary platform, an endless conveyor traveling over said platform and through said oven and carrying a series of core rollers, the conveyor and the platform having different rates of speed, means for feeding pieces of dough upon said platform, a rotary carrier having a series of backing rollers located adjacent to said core rollers, means for rotating both series of rollers, each of the core rollers being adapted in cooperation with its core roller in its rotation over said platform to accumulate the related piece of dough thereon in tubular form, and means for feeding and connecting the core rollers successively to and disconnecting the same from the conveyor including a hopper, a lever operated intermittently by said carrier, a gate operated by said lever and controlling the roller feed from said hopper, and a pivoted arm also operated by said lever and having a hooked free end receiving the core rollers as released by said gate and delivering the same to said conveyor.

In testimony whereof I affix my signature.

CHARLES RAY HASKELL.